US012589561B2

(12) United States Patent
Adachi et al.

(10) Patent No.: US 12,589,561 B2
(45) Date of Patent: Mar. 31, 2026

(54) PREPREG LAMINATE, COMPOSITE STRUCTURE, AND METHOD FOR MANUFACTURING COMPOSITE STRUCTURE

(71) Applicant: Toray Industries, Inc., Tokyo (JP)

(72) Inventors: Kentaro Adachi, Iyo-gun (JP); Masato Honma, Iyo-gun (JP); Hiroaki Matsutani, Iyo-gun (JP)

(73) Assignee: Toray Industries, Inc., Tokyo (JP)

( * ) Notice: Subject to any disclaimer, the term of this patent is extended or adjusted under 35 U.S.C. 154(b) by 204 days.

(21) Appl. No.: 18/278,880

(22) PCT Filed: Mar. 17, 2022

(86) PCT No.: PCT/JP2022/012231
§ 371 (c)(1),
(2) Date: Aug. 25, 2023

(87) PCT Pub. No.: WO2022/202600
PCT Pub. Date: Sep. 29, 2022

(65) Prior Publication Data
US 2024/0059031 A1 Feb. 22, 2024

(30) Foreign Application Priority Data
Mar. 26, 2021 (JP) .................................. 2021-052858

(51) Int. Cl.
*B32B 5/28* (2006.01)
*B29B 15/10* (2006.01)
(Continued)

(52) U.S. Cl.
CPC ............ *B29C 70/46* (2013.01); *B29B 15/105* (2013.01); *B29C 70/12* (2013.01); *B29C 70/742* (2013.01)

(58) Field of Classification Search
CPC .. B32B 5/28; B32B 5/265; B32B 5/26; B32B 3/266
See application file for complete search history.

(56) References Cited

U.S. PATENT DOCUMENTS

| | | | |
|---|---|---|---|
| 9,962,904 B2 | 5/2018 | Hatanaka et al. | |
| 2015/0017853 A1 | 1/2015 | Perillat-Collomb et al. | |

(Continued)

FOREIGN PATENT DOCUMENTS

| | | |
|---|---|---|
| EP | 3 369 768 A1 | 9/2018 |
| JP | 06182765 A | 7/1994 |

(Continued)

OTHER PUBLICATIONS

International Search Report and Written Opinion for International Application No. PCT/JP2022/012231, dated May 24, 2022, 8 pages.

(Continued)

*Primary Examiner* — Joanna Pleszczynska

(74) *Attorney, Agent, or Firm* — Buchanan Ingersoll & Rooney PC

(57) ABSTRACT

A prepreg laminate is described that is a fiber-reinforced plastic material having high rigidity, lightweight properties and excellent moldability, where the prepreg laminate is obtained by a prepreg (A), in which non-continuous reinforcing fibers are impregnated with a thermosetting resin or thermoplastic resin, and a prepreg (B), in which non-continuous reinforcing fibers are impregnated with a thermoplastic resin, being laminated adjacent to each other, and by the prepreg (A) being disposed on at least one surface, at least some combinations of the prepreg (A) and the prepreg (B) adjacent to each other forming an overlap region that satisfies at least one of the requirements (1) and (2) as defined.

5 Claims, 5 Drawing Sheets

(51) Int. Cl.

| | |
|---|---|
| *B29C 70/12* | (2006.01) |
| *B29C 70/46* | (2006.01) |
| *B29C 70/74* | (2006.01) |
| *B32B 5/26* | (2006.01) |

(56) References Cited

U.S. PATENT DOCUMENTS

| | | | |
|---|---|---|---|
| 2016/0194468 A1 | 7/2016 | Ogasawara et al. | |
| 2017/0283571 A1 | 10/2017 | Taketa et al. | |
| 2019/0001586 A1* | 1/2019 | Naito | B29C 70/14 |
| 2020/0307148 A1 | 10/2020 | Takebe et al. | |
| 2022/0315718 A1 | 10/2022 | Naito et al. | |

FOREIGN PATENT DOCUMENTS

| | | |
|---|---|---|
| JP | 2003527491 A | 9/2003 |
| JP | 2009292002 A | 12/2009 |
| JP | 2010-018724 A | 1/2010 |
| JP | 5223354 B2 | 6/2013 |
| JP | 2018159045 A | 10/2018 |
| WO | 2015029634 A1 | 3/2015 |
| WO | 2016043156 A1 | 3/2016 |
| WO | 2017110616 A1 | 6/2017 |
| WO | 2018117181 A1 | 6/2018 |
| WO | 2019078242 A1 | 4/2019 |
| WO | 2021024971 A1 | 2/2021 |

OTHER PUBLICATIONS

Extended European Search Report issued Jan. 20, 2025, by the European Patent Office in corresponding European Patent Application No. 22775388.6-1102. (10 pages).

* cited by examiner (a)                              (b)

PREPREG LAMINATE, COMPOSITE STRUCTURE, AND METHOD FOR MANUFACTURING COMPOSITE STRUCTURE

CROSS REFERENCE TO RELATED APPLICATIONS

This application is the U.S. National Phase of PCT/JP2022/012231, filed Mar. 17, 2022, which claims priority to Japanese Patent Application No. 2021-052858, filed Mar. 26, 2021, the disclosures of these applications being incorporated herein by reference in their entireties for all purposes.

FIELD OF THE INVENTION

The present invention relates to a prepreg laminate including a prepreg (A), in which non-continuous reinforcing fibers are impregnated with a thermosetting resin or thermoplastic resin, and a prepreg (B), in which non-continuous reinforcing fibers are impregnated with a thermoplastic resin, and a composite structure obtained from the laminate.

BACKGROUND OF THE INVENTION

Fiber-reinforced plastics consisting of reinforcing fibers and a matrix resin are lightweight and highly rigid, and therefore are widely used in electrical and electronic applications, civil engineering and construction applications, automobile applications, sports applications, aircraft applications, and the like. In recent years, market demand for fiber-reinforced plastics having a complicated shape has increased particularly in automobiles, aircraft, sports products, and the like.

As a technique for enhancing followability to a complicated shape, for example, a so-called incised prepreg has been developed in which incisions that divide the reinforcing fibers are provided in a prepreg in which continuous reinforcing fibers unidirectionally aligned are impregnated with a resin (Patent Document 1). As a technique for enhancing lightweight properties, for example, a fiber-reinforced plastic configured using non-continuous reinforcing fibers and a thermoplastic resin and including vacant spaces has been developed (Patent Document 2).

Although the fiber-reinforced plastic including vacant spaces as described in Patent Document 2 is excellent in lightweight properties, it is inevitable that rigidity is reduced to some extent. Patent Document 2 attempts to achieve both lightweight properties and rigidity by forming a sandwich structure in which a fiber-reinforced plastic having vacant spaces is used as a core material and a fiber-reinforced plastic using continuous reinforcing fibers is used as a skin material.

However, the sandwich structure described in Patent Document 2 is inferior in followability to a complicated shape because the skin material includes continuous reinforcing fibers. In this regard, Patent Document 3 describes an invention in which, in a sandwich structure including, as a core material, a fiber-reinforced plastic having non-continuous reinforcing fibers, a resin, and vacant spaces, by using non-continuous reinforcing fibers as the reinforcing fibers of the skin material, shapability is improved while a decrease in rigidity is minimized.

PATENT DOCUMENTS

Patent Document 1: Japanese Patent No. 5223354
Patent Document 2: International Publication No. 2015/029634
Patent Document 3: International Publication No. 2018/117181

SUMMARY OF THE INVENTION

However, in the invention described in Patent Document 3, since the non-continuous reinforcing fibers interfere with each other in deformation during molding into a complicated shape, the shape followability of the core material tends to be inferior to that of the skin material, and there is still a limitation on the shape that can be molded, for example, it is difficult to mold a shape having a thickness change.

The present invention has been made in view of the problems above, and an object thereof is to obtain a prepreg laminate that is a fiber-reinforced plastic material having high rigidity and lightweight properties and excellent in moldability into a complicated shape.

One aspect of the present invention for solving the above problems is a prepreg laminate obtained by a prepreg (A), in which non-continuous reinforcing fibers are impregnated with a thermosetting resin or thermoplastic resin, and a prepreg (B), in which non-continuous reinforcing fibers are impregnated with a thermoplastic resin, being laminated adjacent to each other, and by the prepreg (A) being disposed on at least one surface, at least some combinations of the prepreg (A) and the prepreg (B) adjacent to each other forming a region (overlap region) that satisfies at least one of (1) and (2) below:

(1) a coefficient of variation in fiber length of the non-continuous reinforcing fibers included in the prepreg (B) is larger than a coefficient of variation in fiber length of the non-continuous reinforcing fibers included in the prepreg (A); and (2) the prepreg (B) has a plurality of incisions at which the non-continuous reinforcing fibers included in the prepreg (B) are cut, and an average value of a two-dimensional orientation angle of the non-continuous reinforcing fibers included in the prepreg (B) is larger than an average value of a two-dimensional orientation angle of the non-continuous reinforcing fibers included in the prepreg (A).

A composite structure having a layer structure formed by molding the prepreg laminate of the present invention is also understood as one aspect of the present invention.

According to the present invention, it is possible to obtain a composite structure having high followability to a complicated shape and having both high mechanical properties and lightweight properties.

DETAILED DESCRIPTION OF EMBODIMENTS OF THE INVENTION

<Prepreg (B)>

Figure 1:
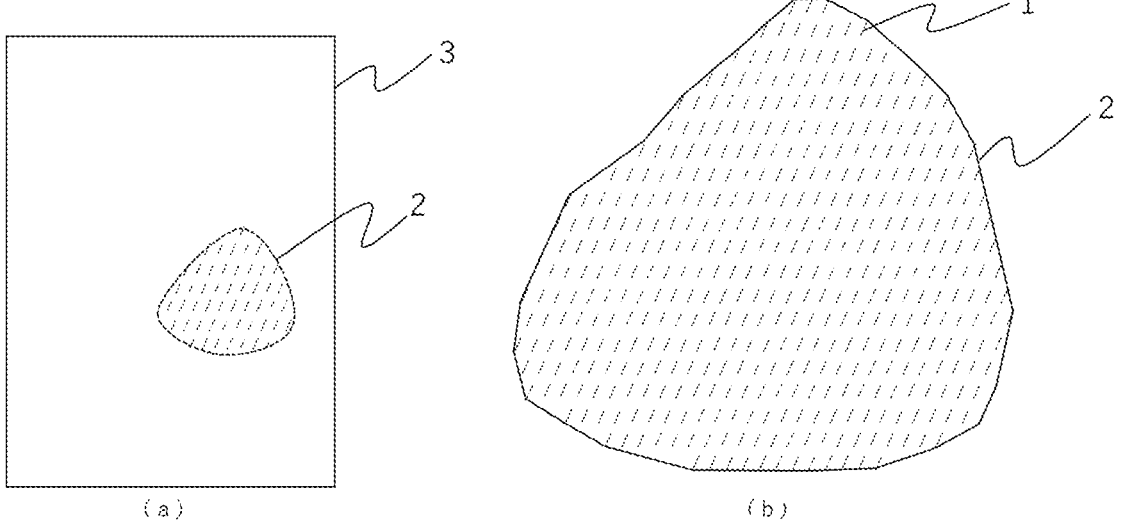
FIG. 1 is a schematic view illustrating one example of a prepreg (A) or a prepreg (B) of the present invention.

A prepreg (B) in the present invention is formed by impregnating non-continuous reinforcing fibers with a thermoplastic resin.

The reinforcing fibers used as the non-continuous reinforcing fibers (hereinafter, it may be simply referred to as the "reinforcing fibers") included in the prepreg (B) are not particularly limited, and for example, carbon fibers, glass fibers, aramid fibers, alumina fibers, silicon carbide fibers, boron fibers, metal fibers, natural fibers, mineral fibers and more can be used, and two or more of these may be used in combination. Among them, PAN-based, pitch-based, and rayon-based carbon fibers are preferably used from viewpoints of a high specific strength, a high specific rigidity, and a lightweight effect. Further, from a viewpoint of enhancing economic efficiency of the obtained molded article, the glass fibers can be preferably used. From a viewpoint of a balance between the mechanical properties and economic efficiency, it is also a preferable aspect to use the carbon fibers and the glass fibers in combination. Furthermore, the aramid fibers can be preferably used from a viewpoint of enhancing an impact absorbability as well as a draping property of the obtained molded article. From the viewpoint of a balance between the mechanical properties and impact absorbability, it is also a preferable aspect to use the carbon fibers and the aramid fibers in combination. Alternatively, reinforcing fibers coated with a metal such as nickel, copper, or ytterbium can also be used from a viewpoint of improving the conductivity of the obtained molded article.

In the present invention, the reinforcing fibers included in the prepreg (B) are non-continuous reinforcing fibers. With such an aspect, a composite structure having excellent shape followability and a complicated shape is easily manufactured. In the present specification, the non-continuous reinforcing fibers mean reinforcing fibers having an average fiber length of 100 mm or less.

Examples of the method of measuring the average fiber length of reinforcing fibers include a method of directly extracting the reinforcing fibers from the non-continuous reinforcing fibers included in the prepreg (B) and measuring the average fiber length by microscopic observation, and a method of dissolving only a thermoplastic resin in the prepreg (B), separating the remaining reinforcing fibers by filtration, and measuring the average fiber length by microscopic observation (a dissolution method). Further, when a solvent that dissolves the thermoplastic resin is absent, there is a method in which only the thermoplastic resin is burned off in a temperature range in which an amount of oxidation of the reinforcing fibers is not reduced, and the reinforcing fibers are separated and measured by microscopic observation (a burning off method). By such a method, 100 single fibers of reinforcing fibers are randomly selected, the length thereof is measured to the order of 1 μm with an optical microscope, and an average value can be taken as the average fiber length. In comparison between the method of directly extracting the reinforcing fibers from the non-continuous reinforcing fibers included in the prepreg (B) and the method of extracting the reinforcing fibers from the prepreg (B) by the bake off method or the dissolution method, no significant difference is produced in the obtained result when the conditions are appropriately selected. A coefficient of variation (standard deviation/average value× 100) in fiber length of the reinforcing fibers included in the prepreg (B) of the present invention is preferably 20% or more and more preferably 30% or more. With such an aspect, since the reinforcing fibers included in the prepreg (B) have various fiber lengths, a balance between expandability during molding and shape followability is excellent.

The non-continuous reinforcing fibers included in the prepreg (B) is preferably in a web form, that is, is a non-continuous reinforcing fiber web. The reinforcing fibers contained in such a non-continuous reinforcing fiber web are usually oriented in three or more directions in a plane. By using the non-continuous reinforcing fiber web, it is easy to randomly disperse the reinforcing fibers in the prepreg (B), and as a result, a prepreg having isotropic mechanical properties and moldability can be obtained. The non-continuous reinforcing fiber web is preferably a nonwoven fabric obtained by a dry method or a wet method.

In such a non-continuous reinforcing fiber web, the reinforcing fibers may be sealed with other components such as a binder resin. The binder resin is preferably selected from a thermoplastic resin and a thermosetting resin from a viewpoint of an adhesiveness between the resin and the reinforcing fibers, sealing only the reinforcing fibers, and ensuring the handleability. From the viewpoint of adhesiveness between the resin and the reinforcing fibers, the same type resin as the thermoplastic resin or a resin having compatibility is selected, and from the viewpoint of ensuring the handleability of the reinforcing fibers, an aqueous solution, dispersion, or emulsion of a thermosetting resin or thermoplastic resin is preferably selected.

The thermoplastic resin impregnated in the non-continuous reinforcing fibers which is used in the prepreg (B) is not particularly limited, and examples thereof include a thermoplastic resin selected from crystalline resins such as "polyesters like polyethylene terephthalate (PET), polybutylene terephthalate (PBT), polytrimethylene terephthalate (PTT), polyethylene naphthalate (PEN), liquid crystal polyesters, and more; polyolefins like polyethylene (PE), polypropylene (PP), polybutylene, and more; polyarylene sulfides like polyoxymethylene (POM), polyamide (PA), polyphenylene sulfide (PPS), and more; fluorine-based resins like polyketone (PK), polyether ketone (PEK), polyether ether ketone (PEEK), polyether ketone ketone (PEKK), polyether nitrile (PEN), polytetrafluoroethylene, and more; liquid crystal polymer (LCP)"; amorphous resins such as "in addition to styrene-based resins, polycarbonate (PC), polymethyl methacrylate (PMMA), polyvinyl chloride (PVC), polyphenylene ether (PPE), polyimide (PI), polyamideimide (PAI), polyetherimide (PEI), polysulfone (PSU), polyether sulfone, and polyarylate (PAR)", and more; additionally, thermoplastic elastomers like phenol-based resins, phenoxy resins, and further, polystyrene-based, polyolefin-based, polyurethane-based, polyester-based, polyamide-based, polybutadiene-based, polyisoprene-based, and fluorine-based resins, acrylonitrile-based, and more; or copolymers and modified products thereof. Among these, the polyolefin is preferable from a viewpoint of lightweight properties of the obtained molded article, the polyamide is preferable from a viewpoint of strength, the amorphous resins like the polycarbonate and the styrene-based resin are preferable from a viewpoint of surface quality, the polyarylene sulfide is preferable from a viewpoint of heat resistance, the polyether ether ketone is preferable from a viewpoint of continuous use temperature, and the fluorine-based resin is preferably used from a viewpoint of chemical resistance.

As the thermoplastic resin, a blend resin containing a plurality of types of the thermoplastic resins may be used, and a blend resin mixed with a thermosetting resin may be used as long as a main component of the thermoplastic resin matrix (a component exceeding 50 wt % when the entire matrix is 100 wt %) is a thermoplastic resin. That is, the "thermoplastic resin" in the present specification means a resin composition containing more than 50 wt % of a thermoplastic resin and exhibiting behavior of the thermoplastic resin as a whole.

It is preferable that the prepreg (B) of the present invention includes a non-continuous reinforcing fiber web and has a plurality of incisions cutting at least some of the non-continuous reinforcing fibers constituting the non-continuous reinforcing fiber web. By having such incisions, the fiber length of some of the reinforcing fibers is further shortened, and the incised end portions of the reinforcing fibers are arranged in a straight line or a curved line, so that the reinforcing fibers do not stretch and the incisions are opened during molding of a complicated shape. Further, since the reinforcing fibers are divided by the incisions, transmission of interference between the reinforcing fibers is interrupted, and it is easy to follow a complicated shape.

Hereinafter, in order to facilitate understanding, the present invention will be described with reference to the drawings as appropriate, but the present invention is not limited by these drawings at all. Further, the description of the specific embodiment shown in the drawings can also be understood as a description of the prepreg (B) as a superordinate concept. As described below, the description of the form of the incisions of the prepreg (B) can also be applied to the prepreg (A) in the present invention.

In the embodiment shown in FIG. 1, a prepreg (B) 3 has incisions 1 cutting at least some of the non-continuous reinforcing fibers. The incisions may be provided over the entire surface of the prepreg (B), or may be provided only in a part thereof. The incisions may be provided on both surfaces, or may be provided on only one surface. In the present specification, a region where the incisions are provided in the surface of the prepreg (B) is referred to as "incised region". As illustrated in FIG. 1, a boundary of an incised region 2 is defined by a line segment group linking line segments connecting the end portions of the incision present on the outermost side of the region. Such a line segment group is drawn such that all incisions are included in the line segment group and a total length of the line segment group is minimized. In other words, in the prepreg (B) of the present invention, the entire surface may be an incised region, or an incised region may be provided in a part of the surface.

The shape of the incisions is not particularly limited, and may be a linear shape, a shape having a polygonal line portion, or a shape having a curved portion partially or entirely, but the incisions are preferably a linear shape in order to stably provide the incisions.

The length of the incisions is not particularly limited, but is preferably 0.1 mm or more, and more preferably 0.5 mm or more in order to facilitate openings of the incisions during molding. On the other hand, in order to have sufficient mechanical properties when the prepreg (B) of the present invention is molded into a composite structure, the length of the incisions is preferably 50 mm or less, and more preferably 10 mm or less. The length of the target incision refers to a length along the incision from one end portion to the other end portion of the target incision.

Figure 2:
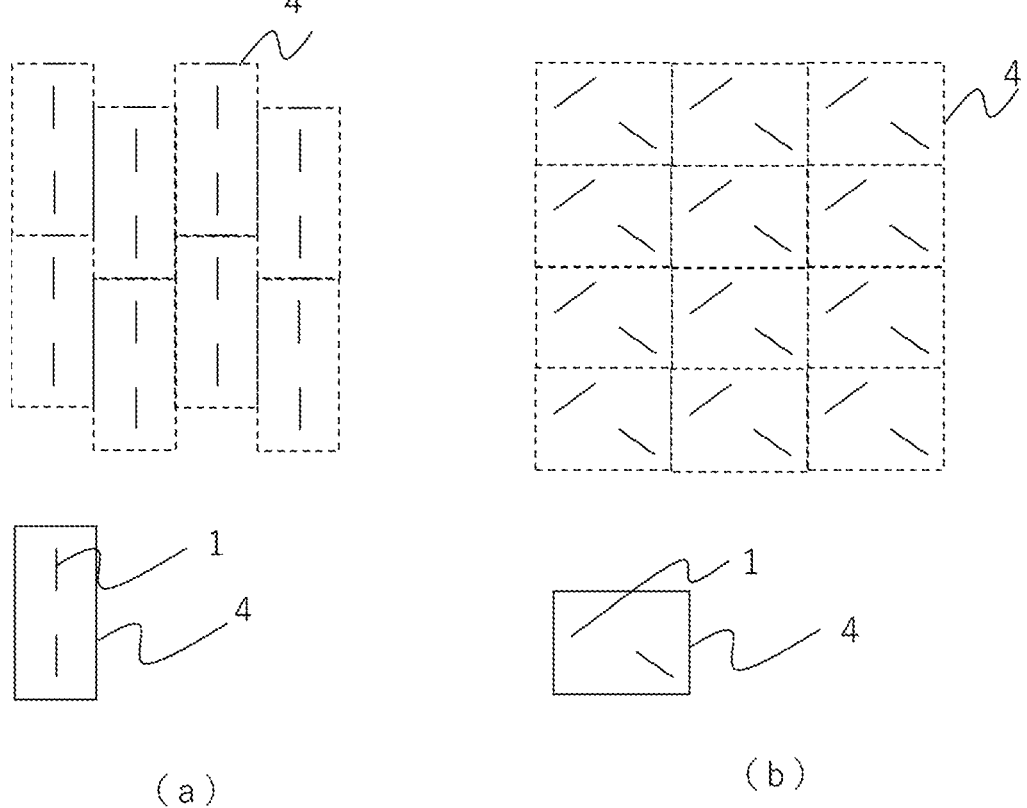
FIG. 2 is a schematic view illustrating one example of an incision arrangement of the prepreg (A) or the prepreg (B) of the present invention.

In the incised region, the incision is preferably formed with a constant pattern in plan view. With such an aspect, it is possible to exhibit a homogeneous shape followability, and it is possible to suppress a large-scale breakage that occurs when the incisions are connected to each other during molding. The phrase "the incision is formed with a constant pattern in plan view" refers to a case where 90% or more of the area of the incised region 2 of the prepreg (B) is arranged with incision units 4 including two or more incisions 1 laid out, as described with reference to FIG. 2.

A sum of the incision lengths converted per 1 $m^2$ in the incised region is preferably 40 m or more. Such an aspect greatly improves the shape followability of the prepreg (B). More preferably, the sum of the incision lengths converted per 1 $m^2$ is 100 m or more, and more preferably 200 m or more. An upper limit of the sum of the incision lengths is not particularly limited, but is preferably 1000 m or less in order to prevent the prepreg (B) from being largely ruptured during molding. When the sum of the incision lengths is converted, the sum of the incision lengths exposed on the front surface and the back surface of the prepreg (B) having an area of at least 0.01 $m^2$ or more in the incised region 2 is calculated, and the calculated value is converted into the sum of the incision lengths per 1 $m^2$. When the sum of the incision lengths is different between the front surface and the back surface, the larger value is adopted as the sum of the incision lengths. For example, in the prepreg (B) in which the area of the incised region 2 on both front and back surfaces is 0.01 $m^2$, in a case where the sum of the incision lengths on the front surface is 0.5 m and the sum of the incision lengths on the back surface is 1 m, the sum of the incision lengths converted per 1 $m^2$ is 100 m.

In the prepreg (B), the non-continuous reinforcing fibers are preferably monofilament. When the reinforcing fibers are monofilament, the prepreg (B) has a more homogeneous shape followability, and when molded, homogeneous mechanical properties are exhibited, stress concentration on the end portions of the reinforcing fibers is suppressed, and high mechanical properties can be exhibited. Here, the phrase "the reinforcing fibers are monofilament" refers to a state in which reinforcing fiber monofilaments are not bundled but independently dispersed in the prepreg (B). In the present invention, when two-dimensional orientation angles to be described later are measured for reinforcing fiber monofilaments arbitrarily selected from the prepreg (B) and reinforcing fiber monofilaments crossing the reinforcing fiber monofilaments, if the ratio of reinforcing fiber monofilaments having a two-dimensional orientation angle of 1° or more is 80% or more, it is determined that the non-continuous reinforcing fibers are in the form of a monofilament. Here, since it is difficult to specify all the reinforcing fiber monofilaments crossing the selected reinforcing fiber monofilaments, 20 single fibers of crossing reinforcing fiber monofilaments are randomly selected, and the two-dimensional orientation angles are measured. This measurement is repeated for five times in total with another reinforcing fiber monofilament, and the ratio of monofilaments having the two-dimensional orientation angle of 1° or more is calculated.

Figure 3:
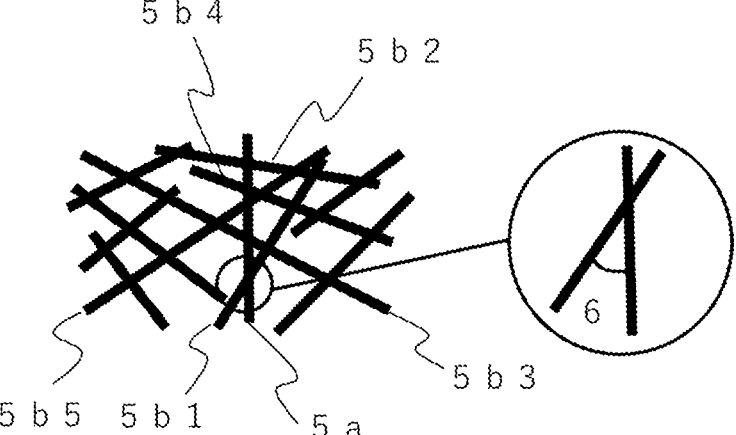
FIG. 3 is a schematic view illustrating one example of an orientation state of reinforcing fibers in the prepreg (B) of the present invention.

The two-dimensional orientation angles will be described in detail with reference to FIG. 3. FIG. 3 is a schematic view showing a dispersion state of the reinforcing fibers when only the reinforcing fibers are extracted from the prepreg (B) of the present invention and observed from the thickness direction. Focusing on a reinforcing fiber monofilament 5a, the reinforcing fiber monofilament 5a crosses reinforcing fiber monofilaments 5b1 to 5b5. Here, crossing means a state in which a reinforcing fiber monofilament focused on in the observed two-dimensional plane is observed to cross another reinforcing fiber monofilament, and the reinforcing fiber monofilament 5*a* and the reinforcing fiber monofilaments 5*b*1 to 5*b*5 are not necessarily in contact with each other in the actual prepreg (B). The two-dimensional orientation angles are defined as a two-dimensional orientation angle 6 of 0° or more and 90° or less among two angles formed by two crossing reinforcing fiber monofilaments.

Specifically, the method for measuring the average value of two-dimensional orientation angles from the prepreg (B) is not particularly limited, and for example, a method for observing the orientation of reinforcing fibers from the surface of the prepreg (B) can be exemplified. In this case, the reinforcing fibers can be more easily observed by polishing the surface of the prepreg (B) to expose the fibers. A method of observing the orientation of the reinforcing fibers using transmitted light in the prepreg (B) can also be exemplified. In this case, the reinforcing fibers can be more easily observed by thinly slicing the prepreg (B). A method of performing transmission observation of the prepreg (B) by X-ray CT to photograph an orientation image of the reinforcing fibers can also be exemplified. For the reinforcing fibers having a high X-ray transmissivity, fibers for a tracer are mixed into the reinforcing fibers, or a chemical for a tracer is applied to the reinforcing fibers, whereby the reinforcing fibers become easier to be observed.

In the prepreg (B), it is preferable that the non-continuous reinforcing fibers are randomly oriented in the plane. Such an aspect exhibits an isotropic shape followability and mechanical properties. The state in which the reinforcing fibers are randomly oriented in the plane refers to a state in which the average value of two-dimensional orientation angles of the reinforcing fibers is in the range of 30° or more and 60° or less. The average value of the two-dimensional orientation angles is more preferably within a range of 40° or more and 50° or less, and it is more preferable as the two-dimensional orientation angles approach 45° which is an ideal angle. The average value of the two-dimensional orientation angles of the present invention is measured by calculating the average value of the two-dimensional orientation angles of all the reinforcing fiber monofilaments (the reinforcing fiber monofilaments 5*b*1 to 5*b*5 in FIG. 3) crossing the randomly selected reinforcing fiber monofilaments (the reinforcing fiber monofilament 5*a* in FIG. 3). When there are a large number of reinforcing fiber monofilaments crossing the reinforcing fiber monofilament 5*a*, 20 single fibers of reinforcing fiber monofilaments crossing the reinforcing fiber monofilament 5*a* may be randomly selected and measured. When there is no reinforcing fiber monofilament crossing the reinforcing fiber monofilament 5*a*, the two-dimensional orientation angle is set to 0°. When the number of reinforcing fiber monofilaments crossing the reinforcing fiber monofilament 5*a* is less than 20, the number of reinforcing fiber monofilaments for which the two-dimensional orientation angle is measured may be less than 20, and the two-dimensional orientation angle is measured only for the reinforcing fiber monofilaments in which the crossing can be confirmed. This measurement is repeated 5 times or more in total with another reinforcing fiber monofilament, and the average value of a total 100 two-dimensional orientation angles is taken as the average value of the two-dimensional orientation angles. When there is not reinforcing fiber monofilament crossing the reinforcing fiber monofilament 5*a* and the two-dimensional orientation angle is set to 0°, the two-dimensional orientation angle is counted as one.

<Prepreg (A)>

In the present invention, the prepreg (A) is formed by impregnating non-continuous reinforcing fibers with a thermosetting resin or a thermoplastic resin.

As the reinforcing fibers included in the prepreg (A), the same reinforcing fibers as those of the prepreg (B) described above can be used.

When a resin used for the prepreg (A) is a thermosetting resin, the thermosetting resin with which the non-continuous reinforcing fibers are impregnated is not particularly limited, and examples thereof include an epoxy resin, an unsaturated polyester resin, a vinyl ester resin, a phenol resin, an epoxy acrylate resin, a urethane acrylate resin, a phenoxy resin, an alkyd resin, a urethane resin, a maleimide resin, and a cyanate resin, and from the viewpoint of mechanical properties, an epoxy resin is particularly preferable. As the thermosetting resin, a blend resin containing a plurality of types of the thermosetting resins may be used, and a blend resin mixed with a thermoplastic resin may be used as long as a main component of the thermosetting resin matrix (a component exceeding 50 wt % when the entire matrix is 100 wt %) is a thermosetting resin. That is, the "thermosetting resin" in the present specification means a resin composition containing more than 50 wt % of a thermosetting resin and exhibiting behavior of the thermosetting resin as a whole.

When the resin used for the prepreg (A) is a thermoplastic resin, the same thermoplastic resin as that of the prepreg (B) described above can be used.

The reinforcing fibers included in the prepreg (A) are non-continuous reinforcing fibers. With such an aspect, a fiber-reinforced plastic having excellent shape followability and a complicated shape is easily manufactured. As a method of measuring the average fiber length of the reinforcing fibers, the same method as the method of measuring the fiber length of the non-continuous reinforcing fibers included in the prepreg (B) described above can be used. A coefficient of variation (standard deviation/average value× 100) (%) in fiber length of the non-continuous reinforcing fibers included in the prepreg (A) of the present invention is preferably less than 20% and more preferably less than 10%. With such an aspect, the fiber length of the non-continuous reinforcing fibers included in the prepreg (A) can be controlled, and stable mechanical properties can be exhibited.

The prepreg (A) preferably includes a fiber bundle composed of non-continuous reinforcing fibers. Such an aspect is preferable because it is excellent in the balance between the mechanical properties and the shape followability. The fiber bundle described herein refers to an aggregate of non-continuous reinforcing fibers in which the average value of the two-dimensional orientation angles is 0° or more and less than 30°.

The prepreg (A) more preferably includes fiber bundles composed of non-continuous reinforcing fibers unidirectionally aligned. When the fiber bundles are unidirectionally aligned, the volume content of the reinforcing fibers can be increased, and a prepreg having high mechanical properties can be obtained. When the reinforcing fibers are discontinuous while being unidirectionally aligned, the shape followability to a complicated shape can be obtained.

Whether or not the fiber bundles are unidirectionally aligned can be determined as follows. First, a baseline is imaginarily set on a prepreg, a fiber orientation angle defined as an angle formed by an average fiber orientation direction of individual non-continuous reinforcing fibers constituting the fiber bundle and the baseline is determined for 100 non-continuous reinforcing fibers included in a target fiber bundle, and the average value is taken as an orientation angle of the fiber bundle. In a case where a difference between the orientation angle of one fiber bundle and the orientation angle of another fiber bundle is less than 10°, it is determined that the two fiber bundles are a set aligned in the same direction. For any fiber bundles included in the prepreg, 20 comparison fiber bundles are randomly selected, and in a case where it is determined that all the comparison fiber bundles are arranged in the same direction as the arbitrary fiber bundle, it is determined that the fiber bundles included in the prepreg are unidirectionally aligned.

In particular, it is preferable that a portion of the prepreg (A) where the non-continuous reinforcing fibers are included has a plurality of incisions, and the non-continuous reinforcing fibers included in the prepreg (A) are formed by cutting continuous reinforcing fibers unidirectionally aligned by the incisions to form fiber bundles of non-continuous reinforcing fibers unidirectionally aligned. Since the length and arrangement of the incisions in this aspect are same as those of the prepreg (B) described above, the repeated description thereof will be omitted.

As another aspect, the non-continuous reinforcing fibers included in the prepreg (A) may be those in which the fiber bundles are aligned in five or more directions in a plane. In a case where a difference between the orientation angle of one fiber bundle and the orientation angle of another fiber bundle is 10° or more, it is determined that the fiber bundles are a set of fiber bundles aligned in different directions, and in a case where there are five sets of fiber bundles aligned in different directions and all the differences in arrangement direction of the respective sets are 10° or more, it is determined that the fiber bundles are aligned in five or more directions in the plane. The number of arrangement directions of the prepreg (A) in this aspect is measured by observing the fiber bundles on the surface of the prepreg (A) with a microscope. Since the fiber bundles of the prepreg (A) are aligned in five or more directions, the fiber bundles easily flow isotropically, and shape followability to a complicated shape is improved. More preferably, when the fiber bundles of the prepreg (A) are aligned in eight or more directions, the fiber bundles easily flow isotropically. Further preferably, an example in which the fiber bundles are randomly and uniformly aligned is mentioned. Examples of the form of such a base material include sheet molding compounds (SMCs).

<Prepreg Laminate>

In the prepreg laminate of the present invention, the prepreg (B) and the prepreg (A) are laminated adjacent to each other, and the prepreg (A) is disposed on at least one surface. The number of laminations of the prepreg (B) and the prepreg (A) is not particularly limited as long as there are one or more sets of the prepreg (B) and the prepreg (A) disposed adjacent to each other. From the viewpoint of mechanical properties, it is more preferable that the prepreg (A) is disposed on both surfaces of the prepreg laminate. From the viewpoint of suppressing warpage of the resulting molded article, it is preferable that the prepreg (B) and the prepreg (A) have a lamination configuration in which the prepreg (B) and the prepreg (A) are laminated symmetrically with respect to the center of the prepreg laminate in the lamination direction. Examples of such a lamination configuration include a lamination configuration of [prepreg (A)/prepreg (A)/prepreg (B)/prepreg (B)/prepreg (A)/prepreg (A)].

In a first aspect of the present invention, in at least a part of the combinations of the prepreg (A) and the prepreg (B) adjacent to each other, a region is formed in which a coefficient of variation in fiber length of the non-continuous reinforcing fibers included in the prepreg (B) is larger than a coefficient of variation in fiber length of the reinforcing fibers included in the prepreg (A). Since the variation in fiber length of the non-continuous reinforcing fibers included in the prepreg (A) in the region is smaller than that in the prepreg (B), mechanical properties are stabilized, and a high reinforcing effect can be obtained. The large variation in fiber length of the non-continuous reinforcing fibers included in the prepreg (B) contributes to high mechanical properties and expandability of the non-continuous reinforcing fibers having a long fiber length, and also contributes to high shape followability because the non-continuous reinforcing fibers having a short fiber length flow under pressure during molding.

In a second aspect of the present invention, in at least a part of the combinations of the prepreg (A) and the prepreg (B) adjacent to each other, a region is formed in which the prepreg (B) has a plurality of incisions at which the non-continuous reinforcing fibers included in the prepreg (B) are cut, and an average value of a two-dimensional orientation angle of the non-continuous reinforcing fibers included in the prepreg (B) is larger than an average value of a two-dimensional orientation angle of the non-continuous reinforcing fibers included in the prepreg (A). In the region, since the prepreg (B) has a plurality of incisions at which the non-continuous reinforcing fibers included in the prepreg (B) are cut, the incisions are opened during molding, shape followability is improved, and it is easy to follow a thickness change or a complicated shape such as an irregularity shape. Since the average value of the two-dimensional orientation angle of the non-continuous reinforcing fibers included in the prepreg (B) in the region is larger than the average value of the two-dimensional orientation angle of the non-continuous reinforcing fibers included in the prepreg (A), the prepreg (B) has isotropic flow characteristics, and thus has high shape followability even when the shape to be molded is a complicated shape, and the prepreg (A) disposed on at least one surface of the prepreg laminate exhibits high mechanical properties. When the prepreg (A) includes the fiber bundle, the two-dimensional orientation angle of the prepreg (A) is measured by selecting a reinforcing fiber monofilament from the group of reinforcing fiber monofilaments forming the same fiber bundle. In the present specification, a region indicated as the first aspect or the second aspect among regions where the prepreg (A) and the prepreg (B) are in contact with each other is hereinafter referred to as "overlap region". In the present specification, portions of the prepreg (A) and the prepreg (B) that form overlap regions with the prepreg (B) and the prepreg (A) adjacent to each other, respectively, may be expressed as "overlap region of the prepreg (A)" and "overlap region of the prepreg (B)".

As described above, in the overlap region, the coefficient of variation in fiber length and the two-dimensional orientation angle of reinforcing fibers included in the prepreg (A) and the prepreg (B) satisfy the above relationships, so that a composite structure excellent in mechanical properties, shape followability, and lightweight properties can be molded. In the present invention, the first aspect and the second aspect do not contradict each other, and the present invention also includes an aspect satisfying both the first aspect and the second aspect. In the prepreg laminate of the present invention, the entire surface of the prepreg (A) and the prepreg (B) adjacent to each other may be an overlap region. It is a preferred aspect of the present invention that all of the prepregs (A) and the prepregs (B) adjacent to each other have such an overlap region.

Examples of a more preferred aspect of the prepreg laminate of the present invention include an aspect in which in the overlap region, an average fiber length of the non-continuous reinforcing fibers included in the prepreg (A) is longer than an average fiber length of the non-continuous reinforcing fibers included in the prepreg (B). Since the fiber length of the prepreg (A) is relatively long, higher mechanical properties can be obtained after molding, and since the fiber length of the prepreg (B) is relatively short, higher shape followability can be exhibited. Such an effect is particularly remarkably exhibited in a prepreg laminate in which the prepreg (B) is laminated so as to be sandwiched between two prepregs (A). In the overlap region, when 50% or more of the non-continuous reinforcing fibers included in the prepreg (B) in terms of the number of fibers have a fiber length equal to or less than the average fiber length of the reinforcing fibers included in the prepreg (A), a balance between the mechanical properties and the shape followability is excellent, which is more preferable.

Examples of a more preferred aspect of the prepreg laminate of the present invention include an aspect in which the prepreg (A) has a plurality of incisions and the non-continuous reinforcing fibers included in the prepreg (A) are formed by cutting continuous reinforcing fibers unidirectionally aligned by the incisions to form fiber bundles unidirectionally aligned, the prepreg (B) has a plurality of incisions cutting at least some of the non-continuous reinforcing fibers in the web form, and the overlap region is formed by overlapping an incised region where the incisions are formed in the prepreg (A) and an incised region where the incisions are formed in the prepreg (B). The overlap region described herein is a region formed by overlapping the incised regions included in the prepreg (B) and the prepreg (A) laminated adjacent to each other when the incised regions are overlapped in the lamination direction. With such an aspect, since both the prepreg (A) and the prepreg (B) adjacent to each other follow the shape in the overlap region, mechanical properties and shape followability are efficiently exhibited.

In the overlap region, when sums of incision lengths converted per 1 $m^2$ of the prepreg (A) and the prepreg (B) are designated as Ca [$m/m^2$] and Cb [$m/m^2$], respectively, it is preferable to satisfy $0.1 \leq Cb/Ca < 5$. Such an aspect is preferable because it is excellent in the balance between the mechanical properties and the shape followability. From the viewpoint of mechanical properties and shape followability, $0.2 \leq Cb/Ca \leq 4$ is preferable and $0.5 \leq Cb/Ca \leq 2$ is more preferable. In consideration of the manufacturing process, $Cb/Ca=1$ is preferable because the sum of incision lengths can be made uniform, and the same incision pattern can be adopted in the prepreg (A) and the prepreg (B).

In a more preferred aspect of the prepreg laminate of the present invention, in the incised region, the incisions of the prepreg (A) and the prepreg (B) are formed in a constant pattern in plan view, and in the overlap region, when an incision pattern of the prepreg (A) and an incision pattern of the prepreg (B) are projected in a thickness direction, at least of some of the incisions of both the prepreg (A) and the prepreg (B) cross each other. With such an aspect, a portion of the prepreg (A) that is particularly excellent in shape followability and a region of the prepreg (B) where non-continuous reinforcing fibers having a short fiber length are present are close to each other, so that short fibers easily flow into a thickness change portion, leading to excellent thickness change followability.

<Method for Manufacturing Composite Structure>

A method for manufacturing a composite structure of the present invention using the prepreg laminate of the present invention includes heating and pressurizing a preform including the prepreg laminate of the present invention. The preform refers to a molded base material including at least a part of the prepreg laminate of the present invention, and may contain a material other than the prepreg laminate of the present invention. Examples of the material other than the prepreg laminate of the present invention include a fiber-reinforced plastic precursor such as a unidirectional continuous fiber prepreg or a woven prepreg from the viewpoint of improving mechanical properties, a metal layer such as a metal foil or a metal plate from the viewpoint of improving mechanical properties and appearance, and a resin layer including no reinforcing fibers from the viewpoint of improving moldability, but are not limited thereto, and any material can be used.

A more preferred aspect of the method for manufacturing a composite structure of the present invention using the prepreg laminate of the present invention includes a heating and pressurizing step of pressurizing the prepreg (B) while heating the prepreg (B) to a temperature at which the thermoplastic resin of the prepreg (B) melts or softens, and an expansion step of relaxing a pressure and increasing a volume by a raising force of the non-continuous reinforcing fibers included in the prepreg (B). Since the method includes the heating and pressurizing step, the thermoplastic resin contained in the prepreg (B) is softened and the prepreg (B) can follow a more complicated shape. Specific examples of the heating and pressurizing step include a method in which a prepreg laminate is placed in a preheated mold, and then the mold is closed and pressurized, a method in which a prepreg laminate is sandwiched between molds and pressurized, and then the temperature of the mold is raised to heat the prepreg laminate, and a method in which a prepreg laminate is sandwiched between molds while the temperature of the mold is raised to heat and pressurize the prepreg laminate, but are not limited thereto, and when a state where the thermoplastic resin of the prepreg (B) is heated to a temperature at which the thermoplastic resin melts or softens is designated as State 1 and a state where the prepreg laminate is pressurized is designated as State 2, at the time point when the prepreg laminate reaches State 1 and State 2 by a certain step, this step is regarded as the heating and pressurizing step. Since the method includes the expansion step, a composite structure excellent in lightweight properties and mechanical properties can be obtained. Specific examples of the expansion step include a method of increasing the volume of the prepreg (B) by reducing the pressure applied to the upper and lower molds subjected to the heating and pressurizing step, and a method of increasing the volume of the prepreg (B) by slightly opening the upper and lower molds to relax the pressure at least temporarily. An increase in volume of the prepreg (B) in the expansion step may occur at least in the above-described overlap region.

When a standard expansion volume and a flow expansion volume of the prepreg (B) in the overlap region as determined as described below are designated as Y and Z, respectively, the expansion step is preferably performed so that Y is larger than Z. The standard expansion volume Y is a volume [$mm^3$] of a fiber-reinforced resin structure obtained by heating only the overlap region of the prepreg (B) included in a preform until an average temperature inside the prepreg (B) is equal to or more than a temperature at which heating is performed in the heating and pressurizing step, and holding the prepreg (B) under atmospheric pressure for 1 hour while maintaining the temperature state. The flow expansion volume Z is a volume [$mm^3$] of a layer derived from the overlap region of the prepreg (B) at the completion of the expansion step. By manufacturing a composite structure so that Y is larger than Z, it is possible to obtain followability to a complicated shape utilizing pressure accompanying expansion of the prepreg (B). In order to further improve shape followability, it is more preferable that $Y/2 \geq Z$.

<Composite Structure>

A composite structure of the present invention obtained from the prepreg laminate of the present invention has a layer structure formed by molding the prepreg laminate of the present invention. More preferably, a layer derived from the prepreg (B) preferably includes vacant spaces. More preferably, in the layer derived from the prepreg (B), it is more preferable that at least a part of the contact points where the non-continuous reinforcing fibers cross each other is bonded with the thermoplastic resin, and vacant spaces are included as a portion where neither the non-continuous reinforcing fibers nor the thermoplastic resin is present.

EXAMPLES

Hereinafter, the present invention will be described in more detail with reference to the examples. However, the scope of the present invention is not limited to these Examples.

<Evaluation Methods>

(1) Average Fiber Length and Coefficient of Variation of Reinforcing Fibers

The prepreg (B) or prepreg (A) having dimensions of 50 mm×50 mm was heated in air at 500° C. for 1 hour to burn off resin components. The remaining 100 single fibers of reinforcing fibers were randomly selected, the length thereof was measured to the order of 1 μm with an optical microscope, and the average value of fiber lengths was calculated as the average fiber length. The standard deviation of the fiber length was calculated from the fiber lengths of 100 reinforcing fibers, and the coefficient of variation was calculated by multiplying a value obtained by dividing the standard deviation by the average value by 100.

(2) Two-Dimensional Orientation Angle of Prepreg (B) or Prepreg (A)

The surface of the prepreg (B) or prepreg (A) was observed with a microscope, 1 single fiber of reinforcing fiber monofilament was randomly selected, and the two-dimensional orientation angle with another reinforcing fiber monofilament crossing the reinforcing fiber monofilament was measured by image observation. As the two-dimensional orientation angle, an angle (acute angle side) of 0° or more and 90° or less was adopted among the two angles formed by two reinforcing fiber monofilaments crossing each other. The number of two-dimensional orientation angles measured per reinforcing fiber monofilament selected was set to n=20. In the prepreg (A), monofilaments crossing each other were limited to the same fiber bundle.

The same measurement was also performed on four reinforcing fiber monofilaments different from the measurement above, and in a case where the ratio of two-dimensional orientation angle of 1° or more was 80% or more among the two-dimensional orientation angles measured on a total of 100 reinforcing fiber monofilaments, it was determined that the reinforcing fibers were monofilaments. Furthermore, in a case where the average value of the two-dimensional orientation angles measured for a total of 100 reinforcing fiber monofilaments was in the range of 30° or more and 60° or less, it was determined that the reinforcing fibers were randomly oriented, and in a case where the average value of the two-dimensional orientation angles is in the range of 0° or more and less than 30°, it is determined that the reinforcing fibers were unidirectionally aligned.

(3) Sum of Incision Lengths

The sum of the incision lengths provided in one prepreg (A) or prepreg (B) used in Examples and Comparative Examples was measured and converted to a length per 1 $m^2$. The sum of the incision lengths was measured for both surfaces, and a numerical value of the surface having a large sum of the incision lengths was adopted.

(4) Standard Expansion Volume Y

The prepreg (B) included in the prepreg laminate used in each of Examples and Comparative Examples was placed in a thermostatic chamber set so that the ambient temperature was the temperature at which heating was performed in the heating and pressurizing step+10° C., maintained under atmospheric pressure for 1 hour, and taken out from the thermostatic chamber and cooled, and the shape was fixed to obtain a molded article derived from the prepreg (B). The bottom area [$mm^2$]×the thickness [mm] of the molded article was measured, and the standard expansion volume Y [$mm^3$] was calculated.

(5) Moldability Test

Figure 4:
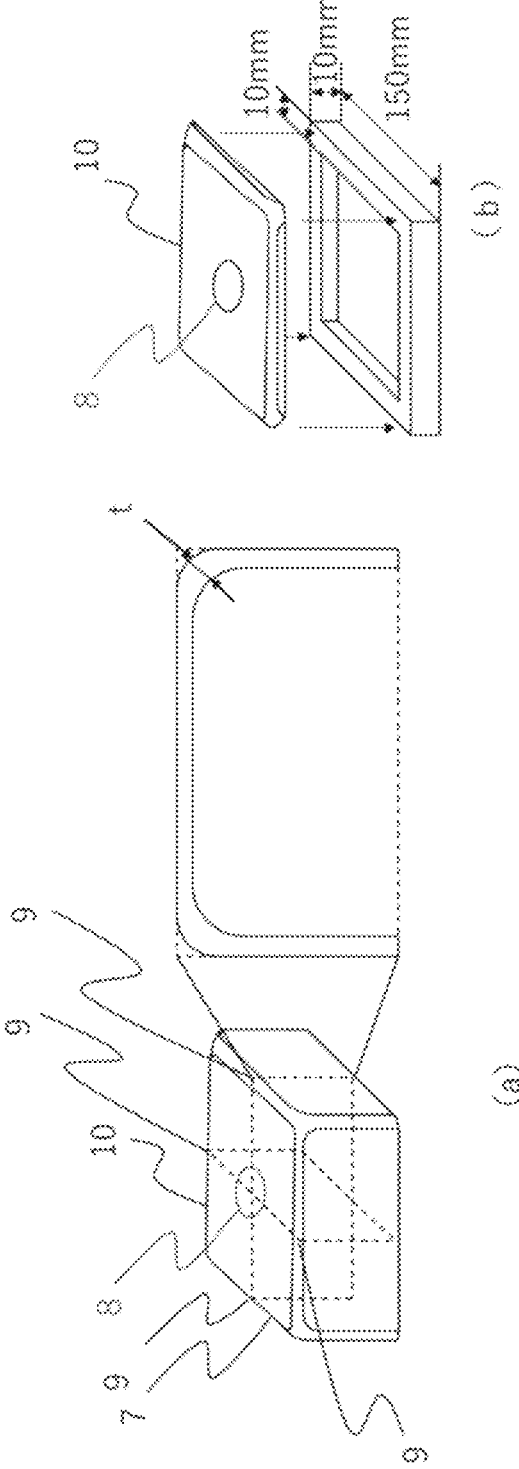
FIG. 4 is a schematic view illustrating one example of an embodiment of the present invention.
Figure 5:
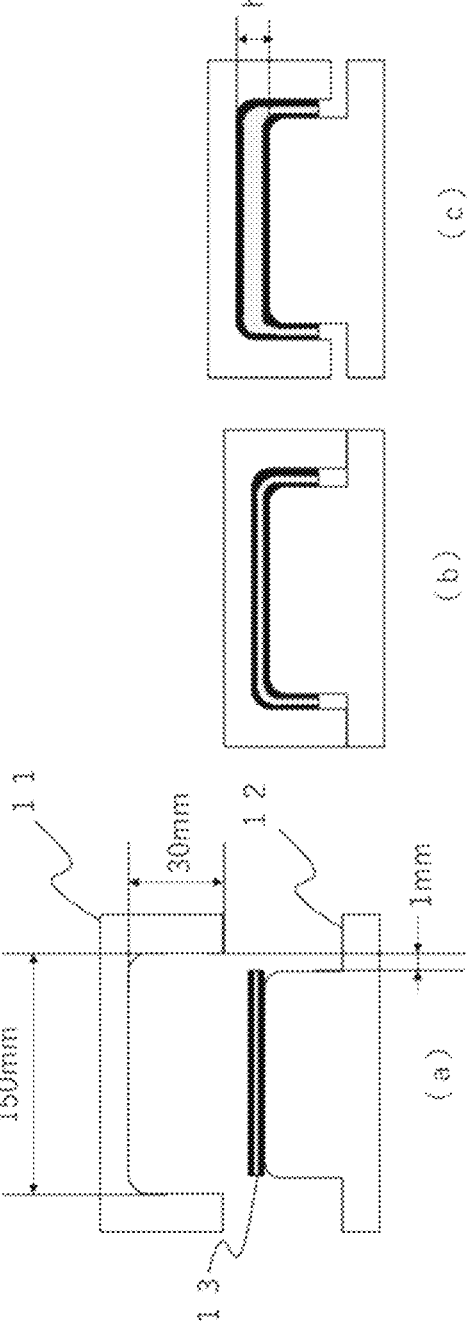
FIG. 5 is a schematic view illustrating one example of an embodiment of the present invention.

A molded body having a shape illustrated in FIG. 4(a) was molded from the prepreg laminate produced in each of Examples and Comparative Examples using upper and lower molds. After the upper and lower molds were heated so that the temperature of the surface of the mold reached 180° C., the prepreg laminate was disposed on the surface of the lower mold as illustrated in FIG. 5(a), the upper mold was placed on the prepreg laminate and held for 30 seconds, the upper and lower molds were then closed so that a pressure of 3 MPa was applied to the prepreg laminate as illustrated in FIG. 5(b), and the prepreg laminate was caused to flow (heating and pressurizing step). After the upper and lower molds were closed and held for 5 minutes while applying a pressure, as illustrated in FIG. 5(c), the upper and lower molds were opened (expansion step) and cooled until the temperature of the mold molding surface reached 60° C. to obtain a molded body including the composite structure.

The surface area and the thickness of the portion derived from the prepreg (B) included in the molded body at the completion of the expansion step were measured, the surface area [$mm^2$]×the thickness [mm] was measured, and the flow expansion volume Z [$mm^3$] was calculated.

A numerical value represented by (the surface area of the component derived from the prepreg (B))/(the surface area of the component derived from the prepreg (A)) in the molded body was calculated as a core packing rate. The surface area of the component derived from the prepreg (B) or the surface area of the component derived from the prepreg (A) refers to the area along an in-plane direction of the component derived from the prepreg (B) or the component derived from the prepreg (A) included in the molded body. When the molded body has a flat plate shape, a projected area in the thickness direction can be used, and when the molded body has a three-dimensional shape, the surface area can be calculated using, for example, CAD software. In this example, the surface area was calculated by modeling the shape of the molded body with general-purpose CAD software. The core packing rate closer to 1 indicates a state where the prepreg (A) and the prepreg (B) are deformed to the same extent and follow the shape with good balance, which means that the shape followability is excellent.

The maximum thickness t of a corner portion 9 with a thickness change of FIG. 4(a) was measured, and thickness change followability was evaluated. In the molded body, "t" was measured at four locations in total, and the average value thereof was taken as the average thickness of the thick portion. In terms of the design of the mold, the maximum thickness of the corner portion is 4 mm, and as the average value of the measured thicknesses is closer to 4 mm, it can be evaluated that molding can be performed with the designed dimensions, and it can be evaluated that the thickness change followability is excellent.

A top surface portion 10 of FIG. 4(b) was cut out from the molded body of FIG. 4(a) to prepare a test piece of 150 mm square, the test piece was placed on a rectangular hollow jig having a side length of 150 mm, a width of 10 mm, and a height of 10 mm, and displacement (displacement during compression) of an indenter when a load was applied up to 100 N with the indenter having a circular surface with a diameter of 20 mm was measured at a position indicated by a load application portion 8 using a mechanical tester and used as an index of rigidity of the molded body. It is evaluated that the smaller the displacement during compression is, the better the mechanical properties are.

(6) Measurement of Orientation Angle of Fiber Bundle Included in Prepreg (A)

The surface of a target fiber bundle was observed with a microscope, and 1 single fibers of reinforcing fiber monofilament was randomly set. A baseline was imaginarily set on the prepreg, and an angle formed by the baseline and the randomly set reinforcing fiber monofilament was measured. The same measurement was performed on 100 reinforcing fibers in total from the same fiber bundle, and the average value of the angles was taken as the orientation angle of the target fiber bundle.

<Production of Prepreg>

[Thermoplastic Resin Sheet (I)]

A thermoplastic resin sheet (I) containing 50 wt % of an unmodified polypropylene resin ("Prime Polypro®" J105G manufactured by Prime Polymer Co., Ltd.) and 50 wt % of an acid-modified polypropylene resin ("Admer" QB510 manufactured by Mitsui Chemicals, Inc.) and having a basis weight of 100 g/m² was prepared.

[Non-Continuous Reinforcing Fiber Web (I)]

A PAN-based continuous carbon fiber bundle having a tensile strength of 4900 MPa, a tensile modulus of elasticity of 230 GPa, and a total number of monofilaments of 12,000 was cut to 6 mm with a cartridge cutter to obtain the non-continuous reinforcing fibers. A dispersion liquid containing water and a surfactant (Polyoxyethylene Lauryl Ether (trade name) manufactured by NACALAI TESQUE, INC.) and having a concentration of 0.1 wt % was prepared, and a non-continuous reinforcing fiber web (I) was produced from the dispersion liquid and the non-continuous reinforcing fibers using an apparatus for producing a non-continuous reinforcing fiber web. A manufacturing device includes, as a dispersing tank, a 1000-mm diameter cylinder-shaped container having an opening cock at a lower portion of the container, and includes a linear transport part (inclination angle: 30°) connecting the dispersing tank to a paper-making tank. A stirrer is attached to the opening portion on an upper surface of the dispersion tank, and the non-continuous reinforcing fibers and the dispersion liquid (a dispersion medium) can be charged from the opening portion. The papermaking tank is a tank including a mesh conveyor having a papermaking surface with a width of 500 mm at a bottom portion, and a conveyor capable of carrying a papermaking base material was connected to the mesh conveyor. Papermaking was performed with a non-continuous reinforcing fiber concentration in the dispersion liquid of 0.05 wt %. The paper-made non-continuous reinforcing fibers was dried in a drying furnace at 200° C. for 30 minutes. The obtained non-continuous reinforcing fiber web (I) had a width of 500 mm, a length of 500 mm, and a basis weight of 100 g/m².

[Resin-Impregnated Base Material (I)]

The non-continuous reinforcing fiber web (I) and the thermoplastic resin sheet (I) were laminated in the order of [thermoplastic resin sheet (I)/non-continuous reinforcing fiber web (I)/thermoplastic resin sheet (I)], and a pressure of 5 MPa was applied at a temperature of 230° C. for 2 minutes to prepare a resin-impregnated base material (I) in which the non-continuous reinforcing fiber web (I) was impregnated with the thermoplastic resin.

[Prepreg (BI)]

By pressing a rotary blade against the resin-impregnated base material (I), incisions with a regular pattern as illustrated in FIG. 2(b) were inserted to obtain a prepreg (BI). The incisions were provided over the entire surface of the prepreg (BI), and the incisions penetrated in the thickness direction of the prepreg (BI). The sum of incision lengths Cb converted per 1 m² was changed as shown in Table 1 in each of Examples and Comparative Examples.

When the two-dimensional orientation angle in the plane of the prepreg (BI) was measured according to the above (2), the proportion of fibers having a two-dimensional orientation angle of 1° or more was 90%. Furthermore, the average value of two-dimensional orientation angles was 45°. In other words, the reinforcing fibers were monofilaments and randomly oriented.

[Continuous Fiber Prepreg (I)]

An uncured epoxy resin composition was adjusted by heating and kneading, with a kneader, epoxy resin (30 parts by weight of "EPIKOTE (registered trade mark)" 828, 35 parts by weight of "EPIKOTE®" 1001, and 35 parts by weight of "EPIKOTE®" 154 manufactured by Japan Epoxy Resins Co., Ltd.) and 5 parts by weight of thermoplastic polyvinyl formal resin ("Vinylec®" K manufactured by CHISSO CORPORATION) to uniformly dissolve polyvinyl formal, and then kneading, with a kneader, 3.5 parts by weight of a curing agent dicyandiamide (DICY7 manufactured by Japan Epoxy Resins Co., Ltd.) and 4 parts by weight of a curing accelerator 3-(3,4-dichlorophenyl)-1,1-dimethylurea (DCMU99 manufactured by Hodogaya Chemical Co., Ltd.). This epoxy resin composition was applied onto a silicone-coated release paper having a thickness of 100 μm using a reverse roll coater to prepare a resin film. Next, the resin film was layered on each of both surfaces of the PAN-based continuous carbon fiber bundles that were unidirectionally aligned, followed by heating and pressurizing, to impregnate the PAN-based continuous carbon fiber bundles with the resin and thus produce a continuous fiber prepreg (I) having a weight per unit area of the carbon fibers of 125 g/m2, a fiber volume content Vf of 55%, and a thickness of 0.125 mm. The two-dimensional orientation angle of the continuous fiber prepreg (I) was measured according to the method described in (2), and the average value of the two-dimensional orientation angles was 2°.

[Prepreg (AI)]

By pressing a rotary blade having a plurality of blades disposed against predetermined positions the continuous fiber prepreg (I), incisions penetrating the continuous fiber prepreg (I) were inserted to form a fiber bundle, thereby obtaining a prepreg (AI). A rotary blade, in which blades having angles of the rotation direction with respect to the traveling direction of +14° and −14° were alternately arranged and the blades were arranged so that all the reinforcing fibers of the continuous fiber prepreg (I) were cut, was used. The sum of incision lengths Ca converted per 1 m² was changed as shown in Table 1 in each of Examples and Comparative Examples. The orientation direction of any fiber bundle included in the prepreg (AI) was measured by the method described in (6), the orientation direction of the fiber bundle was also measured for a total of 20 other comparison fiber bundles, and an angular difference between the orientation direction of the arbitrarily selected fiber bundle and the orientation direction of the comparison fiber bundle was calculated. As a result, the angular difference was 5° or less for both the fiber bundles, and thus it was determined that the fiber bundles included in the prepreg (AI) were unidirectionally aligned.

[Prepreg (AII)]

Chopped prepregs in a fiber bundle form obtained by cutting the continuous fiber prepreg (I) into a width of 3 mm and a length of 30 mm were disposed so that the fiber directions of the chopped prepregs were randomly oriented, and subjected to vacuum compression bonding at 70° C. for 1 minute to prepare a prepreg (AII). The orientation direction of any fiber bundle included in the prepreg (AII) was measured by the method described in (6), the orientation direction of a total of 20 other comparison fiber bundles was also measured in the same manner, and an angular difference between the orientation direction of the arbitrarily fiber bundle and the orientation direction of the comparison fiber bundle was calculated. As a result, it was confirmed that the fiber bundles were oriented in eight directions.

Example 1

Ca of the incision inserted in the prepreg (AI) was set to 400 m/m², and Cb of the incision inserted in the prepreg (BI) was set to 200 m/m². The prepreg (BI) and the prepreg (AI) were both cut to dimensions of 150 mm×150 mm, and laminated in the order of (prepreg (AI)/prepreg (AI)/prepreg (BI)/prepreg (AI)/prepreg (AI)) to obtain a prepreg laminate (I). At this time, the prepregs (AI) adjacent to each other were laminated so that the fiber direction intersected at 90°, and in the overlap region of the prepreg (AI) and the prepreg (BI) adjacent to each other, when the incision pattern of the prepreg (AI) and the incision pattern of the prepreg (BI) were projected in the thickness direction, at least some of the incisions of both the prepreg (AI) and the prepreg (BI) crossed each other.

The moldability test of (5) was performed using the prepreg laminate (I) as a preform. At this time, in FIG. 5(c), the expansion step was performed so that a distance h between the upper mold and the lower mold became 2.0 mm. The results are shown in Table 1.

Example 2

A molded body including a prepreg laminate and a composite structure was obtained in the same manner as in Example 1, except that Ca of the incision inserted into the prepreg (AI) was set to 200 m/m², and Cb of the incision inserted into the prepreg (BI) was set to 20 m/m².

Example 3

A molded body including a prepreg laminate and a composite structure was obtained in the same manner as in Example 1, except that Ca of the incision inserted into the prepreg (AI) was set to 200 m/m², and Cb of the incision inserted into the prepreg (BI) was set to 40 m/m².

Example 4

A molded body including a prepreg laminate and a composite structure was obtained in the same manner as in Example 1, except that Ca of the incision length inserted into the prepreg (AI) was set to 200 m/m², and Cb of the incision length inserted into the prepreg (BI) was set to 100 m/m².

Example 5-1

A molded body including a prepreg laminate and a composite structure was obtained in the same manner as in Example 1, except that Ca of the incision length inserted into the prepreg (AI) was set to 200 m/m², and Cb of the incision length inserted into the prepreg (BI) was set to 200 m/m².

Example 5-2

A molded body including a composite structure was molded in the same manner as in Example 5-1, except that in FIG. 5(c), the expansion step was performed so that the distance h between the upper mold and the lower mold became 2.5 mm.

Example 5-3

A molded body including a composite structure was molded in the same manner as in Example 5-1, except that in FIG. 5(c), the expansion step was performed so that the distance h between the upper mold and the lower mold became 1.7 mm.

Example 6

A molded body including a prepreg laminate and a composite structure was obtained in the same manner as in Example 1, except that Ca of the incision inserted into the prepreg (AI) was set to 200 m/m², and Cb of the incision length inserted into the prepreg (BI) was set to 400 m/m².

Example 7

A molded body including a prepreg laminate and a composite structure was obtained in the same manner as in Example 1, except that Ca of the incision length inserted into the prepreg (AI) was set to 200 m/m², and Cb of the incision length inserted into the prepreg (BI) was set to 800 m/m².

Example 8

A molded body including a prepreg laminate and a composite structure was obtained in the same manner as in Example 5-1, except that the arrangements of the incisions included in the prepreg (AI) and the prepreg (BI) adjacent to each other were the same, and once the prepreg (AI) and the prepreg (BI) were arranged such that all of the incisions overlapped each other, the prepreg (AI) and the prepreg (BI) were slightly shifted from each other in the in-plane direction to be laminated such that all of the incisions did not cross each other.

Example 9

A molded body including a prepreg laminate and a composite structure was obtained in the same manner as in Example 5, except that the prepreg (AII) was used instead of the prepreg (AI). The sum of the incision lengths Ca of the prepreg (A) was not measured because there was no incision.

Example 10

A molded body including a prepreg laminate and a composite structure was obtained in the same manner as in Example 1, except that Ca of the incision inserted into the prepreg (AI) was set to 800 m/m$^2$, and Cb of the incision inserted into the prepreg (BI) was set to 40 m/m$^2$.

Example 11

A molded body including a prepreg laminate and a composite structure was obtained in the same manner as in Example 1, except that Ca of the incision inserted into the prepreg (AI) was set to 100 m/m$^2$, and Cb of the incision inserted into the prepreg (BI) was set to 800 m/m$^2$.

Comparative Example 1

A molded body including a composite structure was molded in the same manner as in Example 5-1, except that the resin-impregnated base material (I) before inserting an incision was used instead of the prepreg (BI). As a result, since the shape followability of the resin-impregnated base material (I) was insufficient, the core packing rate was significantly low, and since the resin-impregnated base material (I) did not follow the shape followability but stretched at the time of pressurization, the shape followability of the corner portion was also significantly reduced. Since the shape was greatly different from the shape of FIG. 4(a), displacement during compression was not measured.

Comparative Example 2

A molded body including a composite structure was molded in the same manner as in Example 5-1, except that the continuous fiber prepreg (I) before inserting an incision was used instead of the prepreg (AI). The fiber was a continuous fiber, and the coefficient of variation in fiber length was not measured. As a result, the continuous fiber prepreg (I) in the surface layer did not follow the shape of the mold, and large wrinkles were observed on the surface. Since the continuous fiber prepreg (I) did not follow the shape of the mold but stretched at the time of pressurization, the shape followability of the corner portion was significantly reduced. Since the shape was greatly different from the shape of FIG. 4(a), displacement during compression was not measured.

TABLE 1

| | | Example 1 | Example 2 | Example 3 | Example 4 | Example 5-1 |
|---|---|---|---|---|---|---|
| Prepreg (A) | Average fiber length [mm] | 2.0 | | 20.0 | | |
| | Coefficient of variation in fiber length [%] | 20 | | 5 | | |
| | Average value [°] of two-dimensional orientation angles of reinforcing fibers | 2 | | 2 | | |
| | Sum of incision lengths Ca [m/m$^2$] | 400 | | 200 | | |
| Prepreg (B) | Average fiber length [mm] | 3.3 | 5.1 | 4.6 | 4.1 | 3.3 |
| | Coefficient of variation in fiber length [%] | 70 | 45 | 50 | 60 | 70 |
| | Average value [°] of two-dimensional orientation angles of reinforcing fibers | 44 | 45 | 45 | 47 | 45 |
| | Sum of incision lengths Cb [m/m$^2$] | 200 | 20 | 40 | 100 | 200 |
| Prepreg laminate | Cb/Ca | 0.5 | 0.1 | 0.2 | 0.5 | 1.0 |
| | Proportion [%] of fibers in prepreg (B) having fiber length equal to or less than average fiber length of reinforcing fibers included in prepreg (A) | 20 | 100 | 100 | 100 | 100 |
| Method for manufacturing molded body | Standard expansion volume Y [mm$^3$] | 67500 | 67500 | 67500 | 67500 | 67500 |
| | Flow expansion volume Z [mm$^3$] | 37100 | 34300 | 34900 | 36000 | 37100 |
| Evaluation | Core packing rate [—] | 0.80 | 0.75 | 0.80 | 0.85 | 0.90 |
| | Average thickness [mm] of thick portion | 3.0 | 2.0 | 2.3 | 2.5 | 2.8 |
| | Thickness [mm] of load application portion | 2.0 | 2.0 | 2.0 | 2.0 | 2.0 |
| | Displacement [mm] during compression | 3.0 | 2.0 | 2.0 | 2.0 | 2.0 |

| | | Example 5-2 | Example 5-3 | Example 6 | Example 7 | Example 8 |
|---|---|---|---|---|---|---|
| Prepreg (A) | Average fiber length [mm] | | | 20.0 | | |
| | Coefficient of variation in fiber length [%] | | | 5 | | |
| | Average value [°] of two-dimensional orientation angles of reinforcing fibers | | | 2 | | |
| | Sum of incision lengths Ca [m/m$^2$] | | | 200 | | |
| Prepreg (B) | Average fiber length [mm] | | 3.3 | 2.8 | 2.4 | 3.3 |
| | Coefficient of variation in fiber length [%] | | 70 | 75 | 80 | 70 |
| | Average value [°] of two-dimensional orientation angles of reinforcing fibers | | 45 | 44 | 43 | 44 |
| | Sum of incision lengths Cb [m/m$^2$] | | 200 | 400 | 800 | 200 |
| Prepreg laminate | Cb/Ca | | 1.0 | 2.0 | 4.0 | 1.0 |
| | Proportion [%] of fibers in prepreg (B) having fiber length equal to or less than average fiber length of reinforcing fibers included in prepreg (A) | | 100 | 100 | 100 | 100 |
| Method for manufacturing molded body | Standard expansion volume Y [mm$^3$] | 67500 | 67500 | 67500 | 67500 | 67500 |
| | Flow expansion volume Z [mm$^3$] | 48400 | 30400 | 38300 | 40500 | 37100 |

TABLE 1-continued

| | | | | | | |
|---|---|---|---|---|---|---|
| Evaluation | Core packing rate [—] | 0.90 | 0.90 | 0.95 | 1.14 | 0.90 |
| | Average thickness [mm] of thick portion | 2.5 | 2.9 | 3.1 | 3.3 | 2.5 |
| | Thickness [mm] of load application portion | 2.5 | 1.7 | 2.0 | 2.0 | 2.0 |
| | Displacement [mm] during compression | 2.5 | 2.0 | 2.0 | 2.0 | 2.0 |

| | | Example 9 | Example 10 | Example 11 | Comparative Example 1 | Comparative Example 2 |
|---|---|---|---|---|---|---|
| Prepreg (A) | Average fiber length [mm] | 30.0 | 1.0 | 50.0 | 20.0 | 150.0 |
| | Coefficient of variation in fiber length [%] | 4 | 30 | 2 | 5 | — |
| | Average value [°] of two-dimensional orientation angles of reinforcing fibers | 2 | 5 | 2 | 2 | 2 |
| | Sum of incision lengths Ca [m/m²] | — | 800 | 100 | 200 | — |
| Prepreg (B) | Average fiber length [mm] | 3.3 | 4.6 | 2.4 | 6.0 | 3.3 |
| | Coefficient of variation in fiber length [%] | 70 | 50 | 80 | 3 | 70 |
| | Average value [°] of two-dimensional orientation angles of reinforcing fibers | 44 | 45 | 46 | 44 | 44 |
| | Sum of incision lengths Cb [m/m²] | 200 | 40 | 800 | — | 200 |
| Prepreg laminate | Cb/Ca | — | 0.05 | 8.0 | — | — |
| | Proportion [%] of fibers in prepreg (B) having fiber length equal to or less than average fiber length of reinforcing fibers included in prepreg (A) | 100 | 5 | 100 | 100 | 100 |
| Method for manufacturing molded body | Standard expansion volume Y [mm³] | 67500 | 67500 | 67500 | 67500 | 67500 |
| | Flow expansion volume Z [mm³] | 37100 | 34900 | 40500 | 33800 | 38300 |
| Evaluation | Core packing rate [—] | 0.90 | 0.73 | 1.30 | 0.71 | 1.40 |
| | Average thickness [mm] of thick portion | 3.8 | 1.4 | 1.6 | 1.0 | 1.0 |
| | Thickness [mm] of load application portion | 2.0 | 2.0 | 2.0 | 2.0 | 2.0 |
| | Displacement [mm] during compression | 2.3 | 3.8 | 2.0 | — | — |

DESCRIPTION OF REFERENCE SIGNS

1: Incision
2: Incised region
3: Prepreg (B)
4: Incision unit
5a, 5b1 to 5b5: Reinforcing fiber monofilament
6: Two-dimensional orientation angle
7: Composite structure
8: Load application portion
9: Corner portion with thickness change
10: Top surface portion
t: Maximum thickness of corner portion with thickness change
11: Upper mold
12: Lower mold
13: Prepreg laminate
h: Distance between upper and lower molds

The invention claimed is:

1. A prepreg laminate comprising:

a prepreg (A), in which non-continuous reinforcing fibers are impregnated with a thermosetting resin or thermoplastic resin, and a prepreg (B), in which non-continuous reinforcing fibers are impregnated with a thermoplastic resin, wherein:

the prepreg (A) and the prepreg (B) are laminated adjacent to each other, with the prepreg (A) being disposed on at least one surface of the prepreg (B), the non-continuous reinforcing fibers included in the prepreg (B) are in a web form, the prepreg (A) has a plurality of incisions and the non-continuous reinforcing fibers included in the prepreg (A) are formed by cutting continuous reinforcing fibers unidirectionally aligned by the incisions to form fiber bundles unidirectionally aligned, the prepreg (B) has a plurality of incisions cutting at least some of the non-continuous reinforcing fibers in the web form, at least some combinations of the prepreg (A) and the prepreg (B) form an overlap region that satisfies at least one of (1) and (2) below:

(1) a coefficient of variation in fiber length of the non-continuous reinforcing fibers included in the prepreg (B) is larger than a coefficient of variation in fiber length of the non-continuous reinforcing fibers included in the prepreg (A); and (2) the prepreg (B) has a plurality of incisions at which the non-continuous reinforcing fibers included in the prepreg (B) are cut, and an average value of a two-dimensional orientation angle of the non-continuous reinforcing fibers included in the prepreg (B) is larger than an average value of a two-dimensional orientation angle of the non-continuous reinforcing fibers included in the prepreg (A), wherein the overlap region is formed by overlapping an incised region where the incisions are formed in the prepreg (A) and an incised region where the incisions are formed in the prepreg (B), and wherein in the overlap region, when sums of incision lengths converted per 1 m² of the prepreg (A) and the prepreg (B) are designated as Ca [m/m²] and Cb [m/m²], respectively, $0.1 \leq Cb/Ca < 5$ is satisfied.

2. The prepreg laminate according to claim 1, wherein in the overlap region, an average fiber length of the non-continuous reinforcing fibers included in the prepreg (A) is longer than an average fiber length of the non-continuous reinforcing fibers included in the prepreg (B).

3. The prepreg laminate according to claim 1, wherein in the overlap region, 50% or more of the non-continuous reinforcing fibers included in the prepreg (B) in terms of the number of fibers have a fiber length equal to or less than the average fiber length of the reinforcing fibers included in prepreg (A).

4. The prepreg laminate according to claim 1, wherein in the incised region, the incisions of the prepreg (A) and the prepreg (B) are formed in a constant pattern in plan view, and in the overlap region, when an incision pattern of the prepreg (A) and an incision pattern of the prepreg (B) are projected in a thickness direction, at least of some of the incisions of both the prepreg (A) and the prepreg (B) cross each other.

5. The prepreg laminate according to claim 1, wherein the prepreg laminate has a lamination configuration in which the prepreg (A) and the prepreg (B) are laminated symmetrically with respect to a center in a lamination direction of the prepreg laminate.

\* \* \* \* \*